(12) United States Patent
Khoshkava et al.

(10) Patent No.: US 10,504,341 B2
(45) Date of Patent: *Dec. 10, 2019

(54) SYSTEMS AND METHODS FOR MULTIFUNCTION HAPTIC OUTPUT DEVICES

(71) Applicant: Immersion Corporation, San Jose, CA (US)

(72) Inventors: Vahid Khoshkava, Montreal (CA); Vincent Levesque, Montreal (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,480

(22) Filed: Dec. 18, 2017

(65) Prior Publication Data

US 2018/0130319 A1 May 10, 2018

Related U.S. Application Data

(63) Continuation of application No. 14/974,456, filed on Dec. 18, 2015, now Pat. No. 9,875,625.

(51) Int. Cl.
*G08B 6/00* (2006.01)
*G06F 3/01* (2006.01)
(Continued)

(52) U.S. Cl.
CPC .............. *G08B 6/00* (2013.01); *G06F 1/1652* (2013.01); *G06F 3/016* (2013.01); *G06F 3/041* (2013.01);
(Continued)

(58) Field of Classification Search
CPC .... G08B 6/00; H04M 1/0266; H04M 1/0268; H04M 2250/22; G06F 3/0487; G06F 3/0412; G06F 3/041; G06F 1/1652; G06F 3/016; G06F 3/0414; G06F 2203/04102; G06F 2203/04809
(Continued)

(56) References Cited

U.S. PATENT DOCUMENTS 9,733,746 B2 * 8/2017 Colgate ................... G06F 3/016
2007/0178942 A1 8/2007 Sadler et al.
(Continued)

FOREIGN PATENT DOCUMENTS

EP 2696964 10/2014
WO WO 2014/137103 9/2014

OTHER PUBLICATIONS

EP Patent Application No. 16204873, Extended European Search Report dated May 23, 2017.
EP 16204873.0 , "Office Action", dated May 24, 2018, 7 pages.

*Primary Examiner* — Brian Wilson
(74) *Attorney, Agent, or Firm* — Kilpatrick Townsend & Stockton LLP (57) ABSTRACT

One illustrative system disclosed herein includes a processor configured to determine a haptic effect and transmit a haptic signal associated with the haptic effect. The illustrative system also includes a multifunction haptic output device configured to receive the haptic signal and output the haptic effect. The multifunction haptic output device includes a single haptic actuator.

18 Claims, 5 Drawing Sheets

(51) Int. Cl.
*G06F 3/0487* (2013.01)
*G06F 1/16* (2006.01)
*G06F 3/041* (2006.01)
*H04M 1/02* (2006.01)

(52) U.S. Cl.
CPC .......... *G06F 3/0412* (2013.01); *G06F 3/0414* (2013.01); *G06F 3/0487* (2013.01); *H04M 1/0266* (2013.01); *H04M 1/0268* (2013.01); *G06F 2203/04102* (2013.01); *G06F 2203/04809* (2013.01); *H04M 2250/22* (2013.01)

(58) Field of Classification Search
USPC .................. 340/407.1, 407.2; 345/156, 173; 381/191
See application file for complete search history.

(56) References Cited

U.S. PATENT DOCUMENTS

| | | |
|---|---|---|
| 2009/0322496 A1 | 12/2009 | Da Costa |
| 2010/0231367 A1 | 9/2010 | Cruz-Hernandez et al. |
| 2010/0231508 A1 | 9/2010 | Cruz-Hernandez et al. |
| 2010/0231539 A1 | 9/2010 | Cruz-Hernandez et al. |
| 2010/0231540 A1 | 9/2010 | Cruz-Hernandez et al. |
| 2010/0231541 A1 | 9/2010 | Cruz-Hernandez et al. |
| 2010/0231550 A1 | 9/2010 | Cruz-Hernandez et al. |
| 2012/0268412 A1 | 10/2012 | Cruz-Hernandez et al. |
| 2012/0286847 A1* | 11/2012 | Peshkin ................. G06F 3/016 327/517 |
| 2014/0139329 A1 | 5/2014 | Ramstein et al. |
| 2014/0307897 A1 | 10/2014 | Takano |
| 2014/0320396 A1 | 10/2014 | Modarres et al. |
| 2014/0320431 A1 | 10/2014 | Cruz-Hernandez et al. |
| 2015/0355710 A1 | 12/2015 | Modarres et al. |
| 2016/0004309 A1 | 1/2016 | Modarres et al. |
| 2016/0224115 A1 | 8/2016 | Olien et al. |
| 2017/0256144 A1 | 9/2017 | Khoshkava et al. |

* cited by examiner

SYSTEMS AND METHODS FOR MULTIFUNCTION HAPTIC OUTPUT DEVICES

CROSS REFERENCE TO RELATED APPLICATIONS

This application is a continuation of and claims priority to U.S. patent application Ser. No. 14/974,456, filed Dec. 18, 2015, and entitled "Systems and Methods for Multifunction Haptic Output Devices," the entirety of which is incorporated herein by reference.

FIELD OF THE INVENTION

The present invention relates to the field of user interface devices. More specifically, the present invention relates to multifunction haptic output devices.

BACKGROUND

The quality of the interfaces through which humans interact with computer-based systems is becoming increasingly important. To create more intuitive and enhanced user experiences, such systems may use visual, audio, and/or haptic feedback to reproduce aspects of interactions in the physical world. Haptic feedback often takes the form of a vibration generated by rotating an offset (asymmetric) mass around a shaft. There is a need for additional types of haptic feedback and devices for providing haptic feedback. Further, as computer-based systems become smaller, there is a need for smaller haptic feedback devices.

SUMMARY

Embodiments of the present disclosure comprise multifunction haptic output devices. In one embodiment, a system of the present disclosure may comprise a processor configured to determine a haptic effect and transmit a haptic signal associated with the haptic effect. The system may also comprise a multifunction haptic output device configured to receive the haptic signal and output the haptic effect. The multifunction haptic output device may comprise a single haptic actuator.

In another embodiment, a method of the present disclosure may comprise determining a haptic effect and transmitting a haptic signal associated with the haptic effect to a multifunction haptic output device. The multifunction haptic output device may be configured to receive the haptic signal and output the haptic effect. The multifunction haptic output device may comprise a single haptic actuator. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Multifunction Haptic Output Devices

One illustrative embodiment of the present disclosure comprises a mobile device (e.g., a smart phone). The mobile device comprises a touch-screen display, a memory, and a processor in communication with each of these elements.

In the illustrative embodiment, the mobile device comprises at least one multifunction haptic output device. The multifunction haptic output device comprises a single haptic output device (e.g., a single haptic actuator) configured to output at least two different classes of haptic effects. As used herein, a haptic effect class comprises one or more haptic effects distinguished by the physical principle(s) used to generate the haptic effects (e.g., rather than the characteristics of the haptic effects actually perceived by a user). For example, a haptic effect class may comprise electrostatic haptic effects (e.g., which may rely on electrostatic interactions between a haptic output device and a user to generate haptic effects). Another haptic effect class may comprise vibrotactile haptic effects (e.g., which may rely on mechanical vibrations to generate haptic effects). Still another haptic effect class may comprise deformation haptic effects (e.g., which may rely on physically changing a shape of a surface to generate haptic effects). Yet another haptic effect class may comprise temperature-based haptic effects (e.g., which may rely on changing a temperature of a surface contacted by a user). Still another haptic effect class may comprise electro-tactile haptic effects (e.g., which may rely on transmitting a current or voltage to a skin surface of a user). The multifunction haptic output device may be configured to output any combination of classes of haptic effects.

In the illustrative embodiment, the multifunction haptic output device comprises multiple layers of material. In the illustrative embodiment, the multiple layers of material comprise an insulator layer, a first electrode layer positioned beneath (e.g., coupled beneath) the insulator layer, a smart material layer (e.g., a dielectric elastomer, a piezoelectric material, and/or a smart hydrogel) positioned beneath the first electrode layer, and a second electrode layer positioned beneath the smart material layer.

In the illustrative embodiment, the mobile device can operate the multifunction haptic output device to selectively generate an electrostatic haptic effect, a vibrotactile haptic effect, a deformation haptic effect, a temperature-based haptic effect, or an electro-tactile haptic effect. For example, the mobile device can cause the multifunction haptic output device to generate an electrostatic haptic effect by transmitting an electrical signal, for example an AC signal, to an electrode layer (e.g., the first electrode layer, the second electrode layer, or both). The electric signal may generate a charge on the electrode layer. The charge may create capacitive coupling with an object (e.g., the user's finger or a stylus) near or touching the electrode layer. A user may perceive the capacitive coupling as an electrostatic haptic effect comprising, for example, a change in the perceived coefficient of friction, a simulated vibration, or a simulated texture.

Additionally or alternatively, the mobile device can cause the multifunction haptic output device to generate a deformation haptic effect by applying a voltage across the first and second electrode layers. The voltage may, for example, cause the first and second electrode layers to generate a magnetic field, heat, an electric field, and/or another stimulus. The stimulus may cause the smart material layer to deform in shape (e.g., expand, contract, bend, flex, and/or twist). The deformation of the smart material may cause a surface associated with the multifunction haptic output device (e.g., a surface of the mobile device to which the multifunction haptic output device may be coupled) to deform in shape. A user may perceive the deformation, e.g., upon contacting the surface, as the deformation haptic effect.

Additionally or alternatively, the mobile device can cause the multifunction haptic output device to generate a vibrotactile haptic effect by applying an alternating voltage across the first and second electrode layers. The alternating voltage may, for example, cause the first and second electrode layers to generate a stimulus or stimuli configured to, e.g., cause the shape of the smart material to repeatedly deform. For example, the alternating voltage may cause the smart material to repeatedly expand and contract in thickness and/or expand and contract in length. The repeated deformation of the smart material may generate mechanical vibrations perceivable by the user, e.g., upon the user contacting the mobile device.

Additionally or alternatively, the mobile device can cause the multifunction haptic output device to generate a temperature-based haptic effect by transmitting an electrical signal, for example a DC signal, to an electrode layer (e.g., the first electrode layer and/or the second electrode layer). The electric signal may cause the electrode layer to generate heat. A user may perceive the heat as the temperature-based haptic effect.

Additionally or alternatively, the mobile device can cause the multifunction haptic output device to generate an electro-tactile haptic effect by transmitting an electrical signal, for example an AC signal, to an electrode layer (e.g., the first electrode layer). A portion of the electrode layer may protrude, at least in part, through the insulator layer. A surface of the user's skin may receive the electrical signal upon physically contacting the portion of the electrode layer protruding through the insulator layer. The electrical signal may stimulate the user's skin, providing the electro-tactile haptic effect.

Thus, the mobile device can generate a plurality of different classes of haptic effects from a single haptic output device including at least: electrostatic haptic effects, vibrotactile haptic effects, temperature-based haptic effects, electro-tactile haptic effects, and deformation haptic effects.

In the illustrative embodiment, the mobile device is configured to output a haptic effect in response to an event. An event, as used herein, is any interaction, action, collision, or other event which occurs during operation of the mobile device which can potentially comprise an associated haptic effect. In some embodiments, an event may comprise user input (e.g., interaction with a real or virtual button; manipulating a joystick; interacting with a touch surface; tilting or orienting a device; or bending, folding, twisting, stretching, or flexing a device), a system status (e.g., low battery, low memory, or a system notification, such as a notification generated based on the system receiving an incoming call), sending data, receiving data, or a program event (e.g., if the program is a game, a program event may comprise explosions, collisions or interactions between game objects, or advancing to a new level). The mobile device may determine a type and/or class of haptic effect to output based on one or more characteristics of the event.

For example, in some embodiments, the mobile device may execute a video game, such as a war video game. The mobile device may output a virtual object, such as a virtual weapon, on the touch-screen display. The mobile device may detect a user interaction with the virtual object via the touch-screen display and responsively output, e.g., an electrostatic haptic effect configured to simulate a texture of the virtual object (e.g., a metal texture of the virtual weapon). The mobile device may output the electrostatic haptic effect via the multifunction haptic output device. Additionally or alternatively, the mobile device may detect the user's virtual character getting injured and responsively output, e.g., a vibrotactile haptic effect comprising a pulsed vibration. The mobile device may output the vibrotactile haptic effect via the multifunction haptic output device. Thus, in some embodiments, both electrostatic haptic effects and vibrotactile haptic effects may be output by the same haptic output device.

The description of the illustrative embodiment above is provided merely as an example, not to limit or define the limits of the present subject matter. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Multifunction Haptic Output Devices

Figure 1:
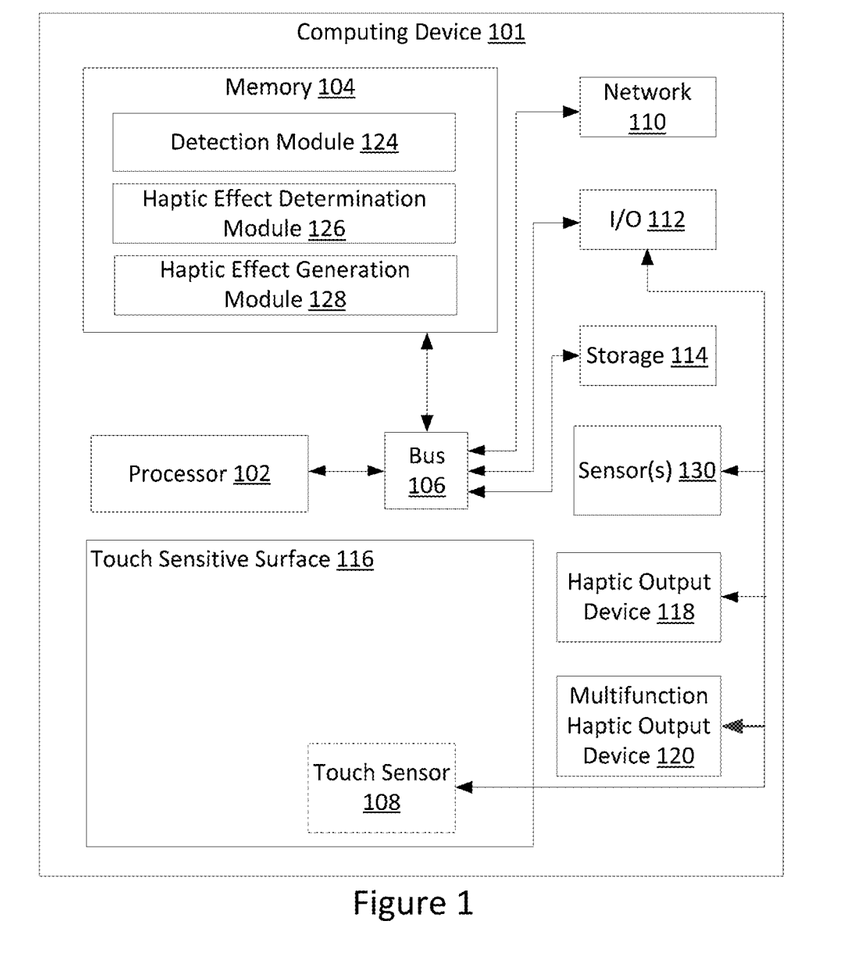
FIG. 1 is a block diagram showing a system for multifunction haptic output devices.

FIG. 1 is a block diagram showing a system for multifunction haptic output devices according to one embodiment. The computing device 101 may comprise a mobile device (e.g., smartphone), laptop computer, desktop computer, tablet, e-reader, game controller, gamepad, remote control, and/or a portable gaming device.

In some embodiments, the components (e.g., the processor 102, network interface device 110, haptic output device 118, haptic output device 120, sensor 130, etc.) of the computing device 101 may be integrated into a single housing. In other embodiments, the components may be distributed (e.g., among multiple housings or locations) and in electrical communication with one another. The computing device 101 may or may not comprise all of the components depicted in FIG. 1. For example, in some embodiments, the computing device 101 may not comprise the sensor 130.

The computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network interface device 110 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, touch sensitive surfaces 116, keyboards, mice, speakers, microphones, buttons, and/or other hardware used to input data or output data. Storage 114 represents nonvolatile storage such as read-only memory, flash memory, ferroelectric RAM (F-RAM), magnetic, optical, or other storage media included in the computing device 101 or coupled to processor 102.

The computing device 101 may comprise a touch sensitive surface 116 (e.g., a touch pad). In some embodiments, the touch sensitive surface 116 is flexible or deformable. Touch sensitive surface 116 represents any surface that is configured to sense tactile input of a user. One or more touch sensors 108 are configured to detect a touch in a touch area (e.g., when an object, such as a user's finger or a stylus, contacts a touch sensitive surface 116) and transmit signals associated with the touch to processor 102. Any suitable number, type, or arrangement of touch sensors 108 can be used. For example, in some embodiments, resistive and/or capacitive sensors may be embedded in touch sensitive surface 116 and used to determine the location of a touch and other information, such as pressure, speed, direction, and/or the proximity of a user's finger to the touch sensitive surface 116.

In some embodiments, the computing device 101 comprises a touch-enabled display that combines a touch sensitive surface 116 and a display of the device. The touch sensitive surface 116 may correspond to the display exterior or one or more layers of material above components of the display. In other embodiments, touch sensitive surface 116 may not comprise (or otherwise correspond to) a display, depending on the particular configuration of the computing device 101.

In some embodiments, the computing device 101 comprises one or more sensor(s) 130. The sensor(s) 130 are configured to transmit sensor signals to the processor 102. The sensor(s) 130 may comprise, for example, a pressure sensor, a contact sensor (e.g., configured to detect an amount of pressure of, and/or a surface area of, a contact), a humidity sensor, ambient light sensor, gyroscope, GPS unit, accelerometer, range sensor, depth sensor, biosensor, camera, and/or temperature sensor.

In some embodiments, the computing device 101 outputs one or more haptic effects based at least in part on sensor signals from sensor 130. For example, in some embodiments, the computing device 101 may execute a health and/or fitness application. In such an embodiment, the computing device 101 may determine a user's heart rate (e.g., via a biosensor) while the user works out and output associated haptic effects, e.g., via a multifunction haptic output device 120. For example, the computing device 101 may output a medium intensity vibration via the multifunction haptic output device 120 if the user's heart rate is at a healthy level. The user may perceive the vibration and maintain an exercise rate (e.g., a speed of pedaling a cardio bicycle or lifting a weight). The computing device 101 may output a stinging sensation (e.g., an electro-tactile haptic effect) via the multifunction haptic output device 120 if the user's heart rate is approaching a dangerous level. The user may perceive the vibration and, e.g., take appropriate action to reduce the user's heart rate.

The computing device 101 comprises one or more haptic output devices (e.g., haptic actuators) in communication with the processor 102. The one or more haptic output devices comprises at least one multifunction haptic output device 120 configured to output a haptic effect in response to a haptic signal. The multifunction haptic output device 120 may be configured to selectively output at least two different classes of haptic effects. For example, the multifunction haptic output device 120 may be configured to output an electrostatic haptic effect (e.g., a simulated texture and/or a perceived change in a coefficient of friction), a vibrotactile haptic effect (e.g., a vibration), a deformation haptic effect (e.g., a haptic effect configured to deform a surface associated with the multifunction haptic output device 120), or any combination of these.

In some embodiments, the multifunction haptic output device 120 may be a portion of the housing of the computing device 101 or internal to the computing device 101. In other embodiments, at least a portion of the multifunction haptic output device 120 may overlay a surface associated with the computing device 101 (e.g., the front, sides, and/or back of the computing device 101). For example, the multifunction haptic output device 120 may comprise a plurality of flexible and/or substantially transparent layers overlaying the touch sensitive surface 116. The multifunction haptic output device 120 may generate one or more haptic effects perceivable by the user in response to a user interacting with the touch sensitive surface 116.

In some embodiments, the multifunction haptic output device 120 is external to computing device 101 and in communication with the computing device 101 (e.g., via wired interfaces such as Ethernet, USB, IEEE 1394, and/or wireless interfaces such as IEEE 802.11, Bluetooth, or radio interfaces). For example, the multifunction haptic output device 120 may be associated with (e.g., coupled to) a remote user interface device (e.g., a wireless joystick and/or game pad) and configured to output haptic effects in response to haptic signals from the processor 102. In some embodiments, the multifunction haptic output device 120 may be associated with a wearable device (e.g., a ring, bracelet, watch, sleeve, collar, hat, shirt, glove, and/or glasses) and/or coupled to a user's body and configured to output haptic effects in response to haptic signals from the processor 102.

The computing device 101 may comprise a plurality of haptic output devices. For example, the computing device 101 may comprise at least two multifunction haptic output devices 120. In some embodiments, the plurality of haptic output devices are different from one another. For example, the computing device 101 may comprise a multifunction haptic output device 120 and another type of haptic output device 118, such as a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, the computing device 101 may actuate multiple haptic output devices of the same or different types in sequence and/or in concert to generate one or more haptic effects.

Turning to memory 104, illustrative program components 124, 126, and 128 are depicted to illustrate how a device can be configured in some embodiments to provide multifunction haptic output devices. In this example, a detection module 124 configures the processor 102 to monitor the touch sensitive surface 116 via touch sensor 108 to determine a position of a touch. For example, the detection module 124 may sample the touch sensor 108 in order to track the presence or absence of a touch and, if a touch is present, to track one or more of the location, path, velocity, acceleration, pressure and/or other characteristics of the touch over time.

Haptic effect determination module 126 represents a program component that analyzes data to select a haptic effect to generate. Particularly, haptic effect determination module 126 may comprise code that determines a haptic effect to output to the user. Further, haptic effect determination module 126 may comprise code that selects one or more haptic effects to provide, and/or one or more haptic output devices 118, 120 to actuate in order to generate the haptic effect.

In some embodiments, the haptic effect determination module 126 may comprise code that determines, based on an interaction with the touch sensitive surface 116, a haptic effect to output and code that selects one or more haptic effects to provide in order to output the effect. For example, the computing device 101 may execute a video game. The computing device 101 may output virtual objects associated with the video game on a touch-screen display (e.g., comprising touch sensitive surface 116). In some embodiments, the computing device 101 may detect a user interaction (e.g., tapping or making a gesture, such as a two-finger pinch, on the touch sensitive surface 116) with a virtual object output on the touch-screen display. Based on the location of the user interaction and/or a characteristic (e.g., texture, size, color, etc.) of the virtual object, the haptic effect determination module 126 may select a haptic effect to generate. For example, if the virtual object comprises a rubbery texture, the haptic effect determination module 126 may determine a haptic effect comprising an increase in a perceived coefficient of friction configured to, e.g., simulate the rubbery texture.

In some embodiments, haptic effect determination module 126 may determine haptic effects based on other kinds of events. For example, the haptic effect determination module 126 may determine a haptic effect based on a system status, such as a low battery status. In such an embodiment, the haptic effect determination module 126 may determine a haptic effect comprising, e.g., a sequence of vibrations configured to indicate to the user that the user needs to charge the computing device 101. In some embodiments, the characteristics of the haptic effect may depend on the characteristics of the system status. For example, the magnitude of the vibrations may be inversely proportional to the amount of battery life left. A user may be able to perceive the vibrations and determine how much battery life the computing device 101 has based on the magnitude of the vibrations.

In some embodiments, the haptic effect determination module 126 may determine a haptic effect configured to provide the user with information. For example, the haptic effect determination module 126 may determine a haptic effect comprising, e.g., a series of pulsed vibrations. The haptic effect may be configured to indicate to the user, e.g., that the user has a missed phone call, text message, e-mail, instant message, and/or other communication.

In some embodiments, the haptic effect determination module 126 may determine a haptic effect based on a program event (e.g., an error notification). In some embodiments, the characteristics of the haptic effect may depend on the characteristics of the program event (e.g., the type of haptic effect may be based on the type of error). For example, if the program event comprises a program failure, the haptic effect determination module 126 may determine an associated haptic effect comprising, e.g., three vibration pulses. In some embodiments, a user may perceive the haptic effect and determine, based on the characteristics of the haptic effect, that the program event (e.g., program failure) occurred.

Haptic effect generation module 128 represents programming that causes processor 102 to generate and transmit a haptic signal to haptic output device(s) 118, 120 to generate the selected haptic effect. The selected haptic effect may comprise an electrostatic haptic effect, a vibrotactile haptic effect, a deformation haptic effect, and/or another class of haptic effect.

In some embodiments, the haptic effect generation module 128 may access stored waveforms or commands to send to haptic output device(s) 118, 120 to generate the selected haptic effect. For example, the haptic effect generation module 128 may access a lookup table to determine a waveform to transmit a multifunction haptic output device 120 to generate a particular haptic effect associated with a particular haptic effect class. In some embodiments, the haptic effect generation module 128 comprises algorithms usable for determining the haptic signal and/or target coordinates for the haptic effect. These target coordinates may comprise, for example, a location on the touch sensitive surface 116 or on a surface of the computing device 101 in which to output the haptic effect (e.g., a texture).

Figure 2:
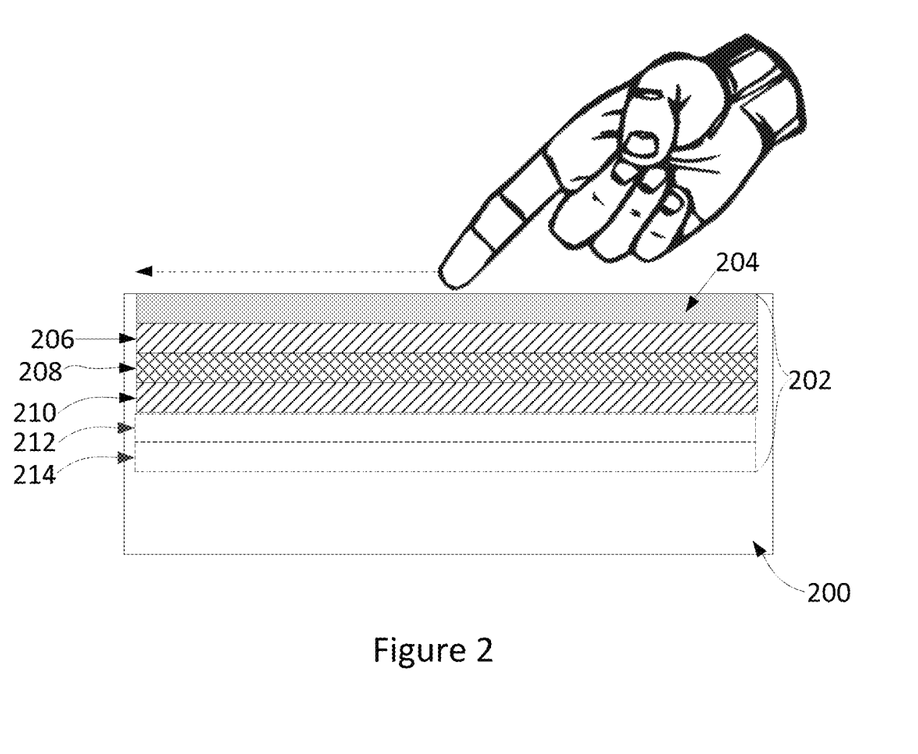
FIG. 2 shows an embodiment of a system for multifunction haptic output devices.

FIG. 2 shows an embodiment of a system for multifunction haptic output devices. The system comprises a computing device 200 (e.g., a housing of a computing device 200). The computing device 200 comprises a multifunction haptic output device 202. In some embodiments, the haptic output device 202 may be coupled to a user interface component (e.g., a joystick, button, touch-sensitive surface, touch-screen display, knob, and/or slider). For example, the haptic output device 202 may be positioned above (e.g., overlaying) or below a touch-screen display.

The haptic output device 202 may comprise a plurality of layers of material. In the embodiment shown in FIG. 2, the haptic output device 202 comprises an insulator layer 204. The insulator layer 204 may comprise any suitable insulating material, such as glass, plastic, aluminum oxide (Al2O3), silicon nitride (Si3N4), an inorganic material, and/or a polymer. In some embodiments, the insulating material may comprise an organic material (e.g., a polyvinylidene-fluoride based polymer, mylar, and/or polymide), and/or an inorganic material (e.g., silicon dioxide). The insulator layer 204 may be flexible and/or thin enough to allow a user to perceive a haptic effect provided by one or more other layers of the haptic output device 202 (e.g., electrode layer 206).

In some embodiments, the haptic output device 202 comprises an electrode layer 206. The electrode layer 206 may comprise any suitable semiconductor or other conductive material, such as copper, aluminum, gold, or silver. The electrode layer 206 may be positioned below and/or coupled to the insulator layer 204.

In some embodiments, the haptic output device 202 comprises a smart material layer 208. The smart material layer 208 may comprise any suitable smart material, such as a dielectric elastomer, a piezoelectric material (e.g., a polyvinylidene-fluoride based material, such as a PVDF polymer, a P(VDF-TrFE) copolymer, and/or a P(VDF-TrFE-CFE) terpolymer; and/or a piezo ceramic material, such as lead zirconium titanate (PZT)), a smart hydrogel (e.g., ionic based and plasticized polyvinyl chloride (PVC)), a shape-memory alloy (e.g., a magnetic shape-memory alloy), and/or a shape-memory polymer. In some embodiments, the smart material may comprise carbon nanotubes, graphene, graphite, a hydrogel, and/or a liquid crystal elastomer. The smart material layer 208 may be positioned below and/or coupled to the electrode layer 206.

In some embodiments, the smart material layer 208 can be fabricated by dissolving a polymer in a solvent to create a combined solution. A mold can be immersed in the solution. The properties of the solution and/or the mold may cause the polymer to form a film around the mold, e.g., in the shape of the mold. The mold may then be extracted from the solution. In some embodiments, the film may be dried and/or may undergo thermal annealing. In some embodiments, a polarity may be induced in the film by applying a high DC voltage across the film. The film may be removed from the mold and usable as the smart material layer 208. In some embodiments, the smart material layer 208 may be processed in a solid state. For example, a polymer film of the smart material layer 208 may be uni-axially and/or bi-axially stretched to a desired thickness. As discussed in greater detail below, in some embodiments, one or more electrode layers 206, 210 may be deposited on one or more surfaces of the smart material layer 208 (subsequent to fabricating the smart material layer 208) to form at least a portion of the haptic output device 202.

In some embodiments, the haptic output device 202 comprises a lower electrode layer 210. The lower electrode layer 210 may comprise any suitable semiconductor or other conductive material, such as copper, aluminum, gold, or silver. The lower electrode layer 210 may be positioned below and/or coupled to the smart material layer 208.

In some embodiments, one or both of the electrode layers 206, 210 may be applied and/or coupled to the surfaces of the smart material layer 208 using, e.g., printing or sputtering techniques. For example, the electrode layer 206 may be printed onto a top surface of the smart material using a liquid conductor. Thus, in such an embodiment, fabrication of the haptic output device 202 may begin with obtaining or manufacturing the smart material layer 208. Thereafter, the electrode layers 206, 210 may be applied to the surfaces of the smart material layer 208 (e.g., using any of the techniques discussed above). The insulator layer 204 may be positioned and coupled over top of the electrode layer 206, e.g., to complete the haptic output device 202.

In some embodiments, the haptic output device 202 comprises a spacer layer (e.g., rather than a smart material layer 208). The spacer layer can be positioned between the electrode layer 206 and the lower electrode layer 210. For example, the haptic output device 202 may comprise a plurality of spacers positioned between the electrode layer 206 and the lower electrode layer 210. In some examples, the spacer layer can include an insulator, such as any of the insulators described above with respect to the insulator layer 204.

The computing device 200 can selectively cause the haptic output device 202 to generate an electrostatic haptic effect, a vibrotactile haptic effect, and/or a deformation haptic effect. For example, the computing device 200 can cause the haptic output device 202 to generate an electrostatic haptic effect by transmitting a first electrical signal, for example an AC signal, to the electrode layer 206. The computing device 200 may transmit a second electrical signal comprising the same voltage as the first electrical signal to the lower electrode layer 210, couple the lower electrode layer 210 to electrical ground, or leave the lower electrode layer 210 electrically floating. Alternatively, the computing device 200 may transmit the first electrical signal to the lower electrode 210 and the second electrical signal to the electrode layer 206, couple the electrode layer 206 to electrical ground, or leave the electrode layer 206 electrically floating. In either case, such a configuration may result in there being no voltage difference across the electrode layers 206, 210. The first electric signal may cause the electrode layer 206, 208 that received the first electrical signal to capacitively couple with a body part of the user, which the user may perceive as the electrostatic haptic effect.

In some embodiments, the electrostatic haptic effect comprises a "dynamic ESF effect." A dynamic ESF effect may comprise an electrostatic haptic effect perceptible to a user upon a user's body part (e.g., a finger) moving relative to a surface associated with the haptic output device 202. For example, a dynamic ESF effect may be perceptible to the user upon the user sliding a finger along the surface of the insulator layer 204 in the direction of the dashed arrow. As another example, a dynamic ESF effect may be perceptible to the user upon computing device 200 moving against the user's body (e.g., while the user remains still). In some embodiments, the dynamic ESF haptic effect may comprise a change in a perceived coefficient of friction, a simulated texture, and/or a simulated vibration. For example, the computing device 200 may output a graphical user interface (GUI) on a touch-screen display comprising one or more virtual user interface components (e.g., buttons, sliders, knobs, etc.). For instance, the GUI may comprise a virtual button. The user interface component may comprise a virtual texture, such as a plastic texture. In some embodiments, the computing device 200 may output a haptic effect in response to the user sliding a finger across a location on the touch-screen display associated with the user interface component. The haptic effect may comprise a dynamic ESF effect configured to, e.g., simulate the plastic texture.

In some embodiments, the electrostatic haptic effect comprises a static ESF effect. A static ESF effect may comprise an electrostatic haptic effect perceptible to a user without the user having to move a body part across, or perpendicular to, a surface associated with the haptic output device 202. Rather, the user may maintain continuous contact (e.g., by gripping or holding) with the surface and perceive the haptic effect. Further, the user may not need to contact the surface at all to perceive the static ESF effect. For example, in the above GUI embodiment, the computing device 200 may output a haptic effect in response to the user hovering a finger above the touch-screen display and over the user interface component. The haptic effect may comprise a static ESF effect configured to, e.g., notify to the user that the user is approaching and/or hovering over an enabled button or a disabled button.

In some embodiments, the computing device 200 can cause the haptic output device 202 to generate a deformation haptic effect and/or a vibrotactile haptic effect. For example, the computing device 200 may cause the haptic output device 202 to generate the deformation haptic effect and/or the vibrotactile haptic effect by applying a voltage to one or both of the electrode layers 206, 210. For instance, the computing device 200 may transmit a voltage to the lower electrode layer 210 and electrically coupled the other electrode layer 206 to electrical ground. This may prevent the user from feeling residual electrostatic attraction (which may corrupt the feeling of the desired haptic effect), e.g., from charge built up on the lower electrode layer 210 due to the voltage. The voltage may cause the electrode layers 206, 210 to stimulate the smart material layer 208, thereby generating the deformation haptic effect and/or the vibrotactile haptic effect.

For example, in the above GUI embodiment, the computing device 200 may output a vibrotactile haptic effect (e.g., a short vibration) in response to the user contacting a virtual user interface component. The haptic effect may, e.g., confirm for the user that the computing device 200 detected the user input. As another example, the computing device 200 may output another haptic effect in response to the computing device 200 executing a particular function (e.g., opening a file, increasing or decreasing a volume, saving a file, etc.) associated with the user interface component. For instance, the computing device 200 may output a deformation haptic effect configured to bend, flex, and/or otherwise deform a surface (e.g., the surface of the touch-screen display) associated with the haptic output device 202. In some embodiments, the haptic effect is configured to, e.g., notify the user that the function has been performed. This may allow the user to visually determine if the function has been performed, e.g., if the user is standing at a distance from the computing device 200. Thus, the mobile device can generate a plurality of different kinds and/or classes of haptic effects from a single haptic output device 202.

In some embodiments, the haptic output device 202 is configured to be used as an input device. For example, the smart material layer 208 may comprise a transducer, such as a piezoelectric material. The smart material layer 308 may generate an electrical signal in response to a user physically manipulating (e.g., contacting and/or bending) the haptic output device 202 (e.g., the user manipulating a surface, such as a touch-screen display, coupled to the haptic output device 202) and transmit the electrical signal to the computing device 200. In some embodiments, the computing device 200 may determine a user input based on the electrical signal. In some embodiments, the computing device 200 may provide haptic effects to the user via the haptic output device 202 concurrently to receiving the user input. For example, the computing device 200 may output an electrostatic-based haptic effect via an electrode layer 206 during at least a portion of a time period in which the computing device 200 receives a user input via the smart material layer 208.

As another example, in some embodiments, one or more electrodes 206, 210 may be usable as a capacitive sensor configured to detect a user input. For example, the computing device 200 may transmit one or more electrical signals to the electrodes 206, 210. The electrodes 206, 210 may responsively generate one or more electrostatic fields. The computing device 200 may monitor a characteristic of the electrostatic field(s) for a change and responsively determine that a user input occurred. In some embodiments, the computing device 200 may provide haptic effects to the user via the haptic output device 202 concurrently to detecting the user input. For example, the computing device 200 may output a deformation-based haptic effect via the smart material layer 208 concurrently to receiving a user input via the electrodes 206, 210.

In some embodiments, the haptic output device 202 does not comprise the lower electrode layer 210. In such an embodiment, the computing device 200 can cause the haptic output device 202 to provide electrostatic haptic effects using, e.g., any of the methods discussed above. Further, in such an embodiment, the computing device 200 may transmit an electric signal to the electrode layer 206 to generate other types and/or classes of haptic effects. The electrode layer 206 may generate heat, a magnetic field, and/or another stimulus in response to the electric signal. The stimulus may cause the smart material layer 208 to vibrate and/or deform in shape. A user may perceive the vibration and/or deformation as a haptic effect.

The haptic output device 202 may comprise additional layers 212, 214. The layers 212, 214 may comprise a smart material layer, an insulator layer (e.g., a spacer layer), and/or an electrode layer. For example, the haptic output device 202 may comprise another smart material layer 212 and/or electrode layer 214. In some embodiments, the haptic output device 202 comprises a second smart material layer 212 positioned below the lower electrode layer 210. The haptic output device 202 may comprise a third electrode layer 214 positioned below the second smart material layer 212. In such an embodiment, the computing device 200 may output an electrostatic-based haptic effect, a temperature-based haptic effect, and/or an electro-tactile haptic effect by transmitting an electrical signal to the electrode layer 206. The computing device 200 may additionally or alternatively output a vibration by transmitting electrical signals to the electrode layer 206 and the lower electrode layer 210. The electrical signals may generate a stimulus that can cause the smart material layer 208 to repeatedly deform, thereby generating the vibration. The computing device 200 may additionally or alternatively output a deformation-based haptic effect by transmitting electrical signals to the lower electrode layer 210 and the third electrode layer 214. The electrical signals may generate a stimulus that can cause the smart material layer 212 to deform, thereby generating the deformation haptic effect. Thus, in some embodiments, the computing device 200 can concurrently generate two or more of an electrostatic haptic effect, a temperature-based haptic effect, an electro-tactile haptic effect, a vibration, and a deformation-based haptic effect.

Other arrangements of the insulator layer 204, electrode layer 206, smart material layer 208, and lower electrode layer 210 are possible. For example, in some embodiments, the lower electrode layer 210 may be positioned and/or embedded within the smart material layer 208 (e.g., rather than below the smart material layer 208).

In some embodiments, the haptic output device 202 is deformable (e.g., flexible, foldable, bendable, twistable, stretchable, rollable, and/or otherwise deformable). For example, the haptic output device 202 may comprise one or more layers 204, 206, 208, 210, 212, 214 that are flexible, bendable, or otherwise deformable. In some embodiments, the haptic output device 202 may be housed in a flexible frame to allow the haptic output device 202 to bend, flex, vibrate, deform, and/or otherwise provide a haptic effect.

In some embodiments, the haptic output device 202 is coupled to a deformable device. The deformable device may comprise a surface and/or a computing device 200 (e.g., a mobile phone) that is deformable. In such an embodiment, as the deformable device is deformed, the haptic output device 202 may also be deformed. For example, a user may interact with (e.g., bend, flex, stretch, and/or twist) the deformable device, e.g., to provide input to the deformable device. The user interaction may also cause the haptic output device 200 to deform. In some embodiments, the haptic output device 202 is configured to output haptic effects while the deformable device is in a deformed state (e.g., a bent or flexed state).

Figure 3:
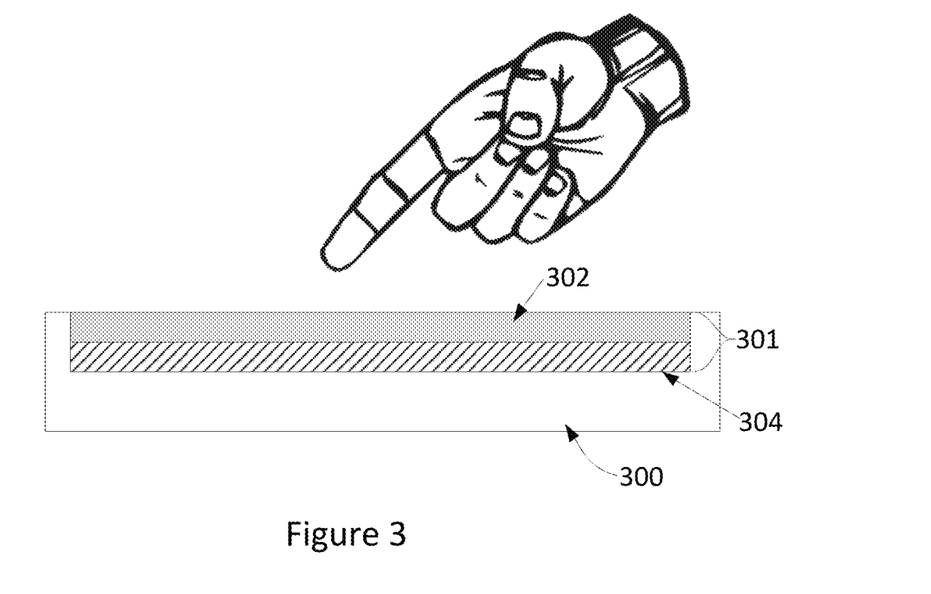
FIG. 3 shows another embodiment of a system for multifunction haptic output devices.

FIG. 3 shows another embodiment of a system for multifunction haptic output devices. In the embodiment shown in FIG. 3, the haptic output device 301 comprises an insulator layer 302 and an electrode layer 304. In some embodiments, the insulator layer 302 may comprise a smart material (e.g., the insulator layer 204 and the smart material layer 208 of FIG. 2 may be combined in one layer). The electrode layer 304 may be configured, e.g., as discussed above. The computing device 300 may cause the haptic output device 301 to generate electrostatic haptic effects, deformation haptic effects, vibrotactile haptic effects, etc., using, e.g., any of the methods discussed with respect to FIG. 2.

For example, the computing device 300 may execute a video game, such as a skateboarding video game. The video game may output, via a touch-screen display, a virtual character, e.g., skateboarding down a street. The virtual character may be controllable by a user. In some embodiments, the computing device 300 may cause the haptic output device 301 to generate a vibration, e.g., in response to a virtual character falling off the virtual skateboard or otherwise impacting a virtual object on the street. The computing device 300 may cause the haptic output device 301 to generate the vibration by transmitting an electrical signal to the electrode layer 304. The electrical signal may cause the electrode layer 304 to generate an electrostatic field, which may cause the smart material (e.g., of the insulator layer 302) to repeatedly deform in shape. This may generate mechanical vibrations (e.g., in the computing device 300) perceivable by the user.

Illustrative Methods for Multifunction Haptic Output Devices

Figure 4:
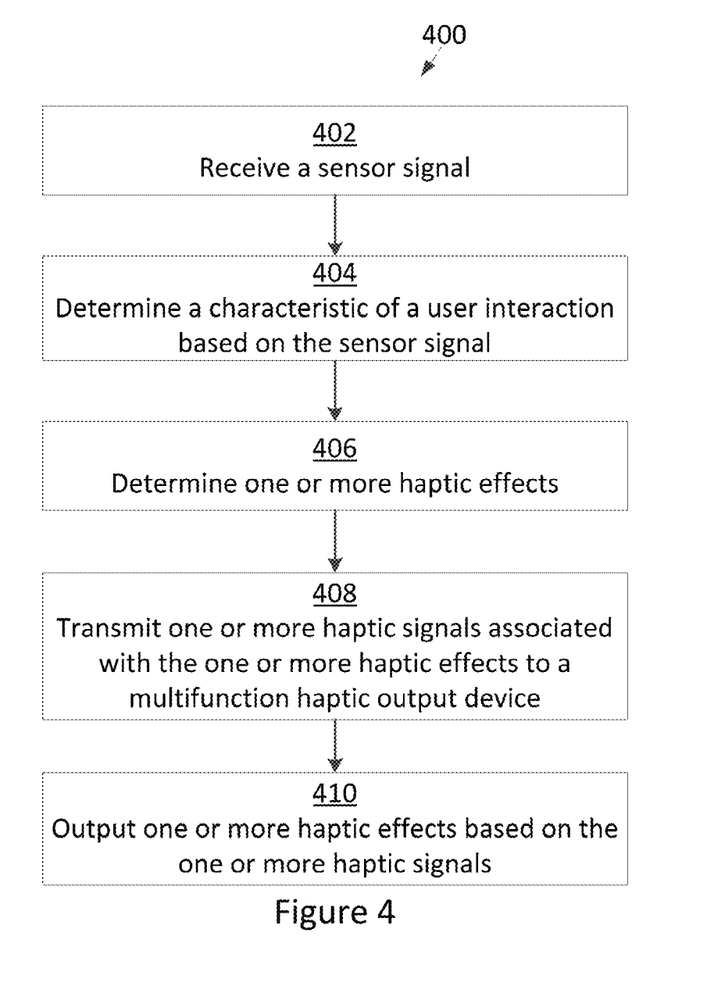
FIG. 4 is a flow chart of steps for performing a method for providing multifunction haptic output devices according to one embodiment.

FIG. 4 is a flow chart of steps for performing a method for providing multifunction haptic output devices according to one embodiment. In some embodiments, the steps in FIG. 4 may be implemented in program code that is executed by a processor, for example, the processor in a general purpose computer, a mobile device, or a server. In some embodiments, these steps may be implemented by a group of processors. In some embodiments one or more steps shown in FIG. 4 may be omitted or performed in a different order. Similarly, in some embodiments, additional steps not shown in FIG. 4 may also be performed. The steps below are described with reference to components described above with regard to computing device 101 shown in FIG. 1.

For simplicity, the steps below are described with reference to a video-watching application (e.g., a video player). But the steps below are not limited to such an embodiment, and any combination of the steps can be employed via other types of applications and/or devices.

The method 400 begins at step 402 when the processor 102 receives a sensor signal from a sensor. For example, the processor 102 may execute the video-watching application. The user may contact or otherwise interact with (e.g., tap on, gesture across, swipe along, or perform a two-finger pinch on) a virtual user interface component of the video-watching application via touch-sensitive surface 116. In some embodiments, the user may interact with a virtual play button to play a digital movie or other media file. The processor 102 may receive a sensor signal from touch-sensitive surface 116 (e.g., via touch sensor 108) associated with the user interaction. The sensor signal may comprise, for example, a location, speed, and/or amount of pressure associated with the user interaction. For example, the sensor signal may comprise an amount of pressure with which the user interacted with the user interface component of the video-watching application.

In some embodiments, the computing device 101 may be deformable. The user may be able to input information into the computing device 101 by, for example, flexing, folding, bending, twisting, stretching, rolling, and/or otherwise deforming the computing device 101. For example, the processor 102 may receive a sensor signal from a sensor 130 (e.g., a camera, strain gauge, capacitive sensor, etc.) associated with the user bending the computing device 101 in one direction, e.g., to play a video via the video-watching application. The processor 102 may receive a sensor signal associated with the user bending the computing device 101 in another direction, e.g., to stop or pause a video that is playing in the video-watching application. The processor 102 may receive a sensor signal associated with the user twisting the computing device 101, e.g., to clear the video from the video-watching application.

The method 400 continues at step 404 when the processor 102 determines a characteristic (e.g., type, duration, and/or location) of a user interaction based at least in part on the sensor signal. For example, the processor 102 may determine, based on the sensor signal, an amount of force (e.g., pressure) with which the user contacted the touch-sensitive surface 116 to interact with the user interface component of the video-watching application. As another example, the processor 102 may determine a surface area of a contact (e.g., between the user's finger and the touch-sensitive surface 116) associated with the user interaction with the user interface component.

In some embodiments, the processor 102 may use one or more lookup tables or algorithms to determine the characteristic. For example, the processor 102 may map a particular user interaction to one or more characteristics of (e.g., the waveform, amplitude, frequency, duration, and/or data carried by) the sensor signal. As a particular example, the processor 102 may use a lookup table to identify a particular user interaction, such as flexing the computing device 101 in a particular direction (e.g., to interact with the video-watching application), based on the characteristics of the sensor signal.

The method 400 continues at step 406 when the processor 102 determines one or more haptic effects. In some embodiments, the processor 102 determines a haptic effect based at least in part on the user interaction. For example, the processor 102 may determine the haptic effect based a type, location, force of, contact area of, surface area of, duration, and/or other characteristics of the user interaction with the user interface component. In some embodiments, the processor 102 may access a lookup table stored in memory 104 to map a particular type of user interaction to a particular haptic effect. For example, the processor 102 may map a tap on a play button to a corresponding haptic effect (e.g., a vibration) via a lookup table.

In some embodiments, the processor 102 determines a haptic effect based on a perceivable strength of the haptic effect to the user. For example, in some embodiments, the processor 102 may detect a user contacting the computing device 101 to interact with the user interface component of the video-watching application. The processor 102 may determine that one class of haptic effect should be output because it may be perceived as stronger by the user than another class of haptic effect. For example, the processor 102 may determine that, due to how the user is contacting or holding the computing device 101, a vibrotactile haptic effect should be output because it may be perceived as stronger to the user than an electrostatic haptic effect and/or a deformation haptic effect.

In some embodiments, a user may perceive an electrostatic haptic effect as weaker and/or lower quality as the user contacts a surface of the computing device 101 (e.g., an insulator layer of the haptic output device 120) with an increasing amount of pressure. Thus, in some embodiments, the processor 102 may determine a vibrotactile haptic effect and/or a deformation haptic effect in response to the amount of pressure exceeding a threshold. This may allow the computing device 101 to consistently generate haptic effects of high quality.

For example, the processor 102 may have determined an electrostatic haptic effect in response to the user interacting with the user interface component of the video-watching application. The processor 102 may cause the electrostatic haptic effect to be output. In some embodiments, the processor 102 may change the electrostatic haptic effect to a vibrotactile haptic effect and/or a deformation haptic effect in response to an amount of pressure associated with the user interaction exceeding the threshold. The processor 102 may, for example, stop outputting the electrostatic haptic effect and cause the vibrotactile haptic effect and/or a deformation haptic effect to be output. This may allow the user to consistently receive haptic effects of high quality as the user interacts with the user interface component.

In some embodiments, a user may perceive an electrostatic haptic effect as weak and/or low quality if a surface area of a contact between the user and a surface of the computing device 101 (e.g., an insulator layer of the haptic output device 120) exceeds a threshold. For example, the user may perceive an electrostatic haptic effect as weak if the surface area of the contact covers (e.g., completely) the surface area of an electrode of the haptic output device 120. Thus, in some embodiments, the processor 102 may determine a vibrotactile haptic effect and/or a deformation haptic effect in response to the surface area of the contact exceeding the threshold. This may allow the computing device 101 to consistently generate haptic effects of high quality.

For example, the processor 102 may have determined an electrostatic haptic effect in response to the user contacting the user interface component of the video-watching application. The processor 102 may cause the electrostatic haptic effect to be output. In some embodiments, the processor 102 may change the electrostatic haptic effect to a vibrotactile haptic effect and/or a deformation haptic effect in response to a surface area of the contact exceeding the threshold. The processor 102 may, for example, stop outputting the electrostatic haptic effect and cause the vibrotactile haptic effect and/or a deformation haptic effect to be output. This may allow the user to consistently receive haptic effects of high quality as the user interacts with the user interface component.

In some embodiments, the processor 102 determines a haptic effect based on a position of a body part of the user. For example, in some embodiments, the processor 102 may receive a sensor signal (e.g., from a camera) indicating that the user is not physically contacting the computing device 101. For instance, the user may hover a finger above the touch-sensitive surface 16 and over a location of the user interface component of the video-watching application. In such an embodiment, the processor 102 may determine a haptic effect configured to be perceptible to the user, e.g., despite the user's lack of contact with the computing device 101. For example, the processor 102 may determine a haptic effect comprising a static ESF effect. Such a haptic effect may be perceivable to the user, e.g., whereas other haptic effects (e.g., vibrations) may be imperceptible to the user.

In some embodiments, the processor 102 determines a haptic effect based on a characteristic (e.g., a height, width, shape, color, location, function, texture, and/or other characteristic) associated with a virtual object and/or an event.

In some embodiments, the processor 102 determines a plurality of haptic effects. For example, the processor 102 may determine a haptic effect (e.g., a rumbling vibration) in response to a movie event, such as an explosion, occurring as the user watches a movie via the video-watching application. The haptic effect may be configured to, e.g., simulate a real explosion. In some embodiments, the processor 102 may also determine another haptic effect upon the user interacting with a virtual object displayed in the movie (e.g., via a touch-screen display), such as a user interacting with a car's tire during a car chase scene in the movie, The haptic effect may be configured to, e.g., simulate the rubber texture of the car's tire. In some embodiments, the computing device 101 can output at least two the plurality of haptic effects substantially concurrently using a multifunction haptic output device 120. For example, the processor 102 may cause the multifunction haptic output device 120 to output both the rumbling vibration associated with the explosion and the rubber texture associated with the car's tire substantially simultaneously. The plurality of haptic effects may provide a more realistic and immersive representation of the virtual object (e.g., the virtual ball) to the user.

In some embodiments, the processor 102 may additionally or alternatively determine a class of haptic effects or a plurality of classes of haptic effects based on any of the methods discussed above. For example, the processor 102 may determine a haptic effect class based on a characteristic of a user interaction, a characteristic of a virtual object, a perceived strength of a haptic effect, a location of a body part of a user, or any combination of these.

The method 400 continues at step 408 when the processor 102 transmits one or more haptic signals associated with the one or more haptic effects to a multifunction haptic output device 120.

In some embodiments, the processor 102 may generate the haptic signals using one or more lookup tables. For example, the processor 102 may access a lookup table stored in memory 104 to determine a particular haptic signal to use to generate a particular haptic effect, e.g., using the multifunction haptic output device 120. A haptic signal may comprise an amplitude, frequency, duration, waveform, and/or other characteristic for generating a particular haptic effect (e.g., using the multifunction haptic output device 120). The processor 102 may, for example, transmit the haptic signal to one or more electrodes of the multifunction haptic output device 120 to generate a haptic effect.

In some embodiments, a haptic signal is generated by accessing a stored algorithm and inputting parameters associated with a haptic effect. For example, the processor 102 may input a code associated with a haptic effect class (e.g., the code may be 001 for an electrostatic haptic effect, 002 for a vibrotactile haptic effect, and 003 for a deformation haptic effect), an amplitude parameter, and/or a frequency parameter into an algorithm to determine the haptic signal.

In some embodiments, the processor 102 may generate the haptic signal using both lookup tables and algorithms. For example, the processor 102 may access a lookup table to map a haptic effect class to one or more corresponding algorithms. The processor 102 may then input one or more parameters into one or more of the algorithms to generate the haptic signal.

The method 400 continues at step 410 when the multifunction haptic output device 120 receives the one or more haptic signals and outputs the one or more haptic effects. The multifunction haptic output device 120 is configured to output multiple different classes of haptic effects (e.g., electrostatic haptic effects, deformation haptic effects, vibrotactile haptic effects, changes in a temperature, etc.). For example, the multifunction haptic output device 120 may be a single haptic output device configured to generate a vibration (e.g., a vibrotactile haptic effect) and/or a simulated texture (e.g., an electrostatic haptic effect) in response to the haptic signals.

Additional Illustrative Systems of Multifunction Haptic Output Devices

Figure 5:
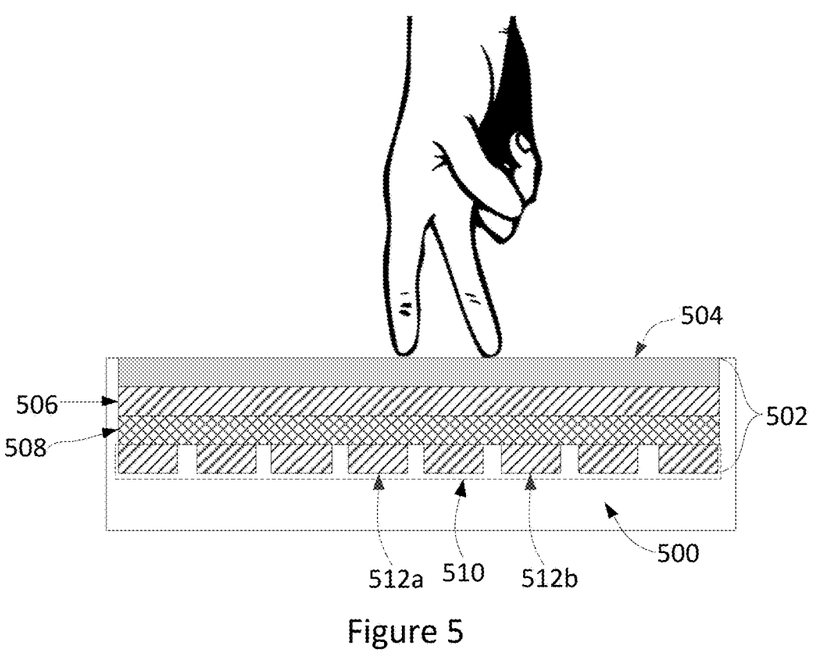
FIG. 5 shows another embodiment of a system for multifunction haptic output devices.

FIG. 5 shows another embodiment of a system for multifunction haptic output devices. The system comprises a haptic output device 502. The haptic output device 502 comprises an insulator layer 504, an electrode layer 506, and a lower electrode layer 510.

In the embodiment shown in FIG. 5, the lower electrode layer 510 comprises a plurality of electrodes, rather than being a single uniform electrode layer. For example, the lower electrode layer 510 comprises electrodes 512a and 512b. In some embodiments, the electrode layer 506 comprises a plurality of electrodes, rather than being a single uniform layer. The computing device 500 may cause the haptic output device 502 to generate haptic effects using, e.g., any of the methods discussed with respect to FIGS. 2-3.

In some embodiments, the computing device 500 generates one or more haptic effects by actuating all, or a subset of, the electrodes within the lower electrode layer 510. The computing device 500 can selectively actuate any number and configuration of electrodes in sequence or in concert to generate a haptic effect. For example, the computing device 500 may actuate electrodes 512a and 512b in response to detecting a user contacting one or more locations on a surface associated with electrodes 512a and 512b. For instance, the computing device 500 may transmit electrical signals to electrodes 512a and 512b in response to detecting the user contacting the insulator layer 504 with two fingers, e.g., as shown in FIG. 5. The electrodes 512a and 512b may receive the electrical signal and responsively cause one or more portions of the smart material layer 508 to deform. The deformation(s) may be perceived by the user as one or more haptic effects (e.g., such as an individualized and/or localized haptic effects).

In some embodiments, the computing device 500 generates one or more haptic effects by actuating all, or a subset of, a plurality of electrodes within the electrode layer 506. For example, the computing device 500 may output an electrostatic-based haptic effect by transmitting substantially the same voltage to all of the electrodes in the electrode layer 506. This may cause the electrodes to generate a capacitive coupling with a user's body, e.g., as discussed with respect to FIGS. 2-3. For example, the electrodes may generate a capacitive coupling with each of the user's fingers. The user may perceive the capacitive coupling as a haptic effect.

As discussed above, the electrode layer 506, lower electrode layer 510, or both can include a plurality of electrodes. The plurality of electrodes may comprise any number of electrodes, arranged in any configuration, and including any number of shapes. For example, the plurality of electrodes may comprise a plurality of electrode strips. The electrode strips may be arranged in a diagonal pattern, a horizontal pattern, a vertical pattern, or another pattern across one or more surfaces of the haptic output device 502 (e.g., a lower surface of the insulator layer 504 and/or an upper surface of the smart material layer 508). As another example, one or more of the electrodes may comprise a circular, triangular, oval, square, rectangular, or other shape. For example, a perimeter or circumference of the electrodes may comprise a circular, triangular, oval, square, rectangular, or other shape. The computing device 500 can generate haptic effects by actuating any combination of the electrodes.

In some embodiments, the smart material layer 508 additionally or alternatively comprises a plurality of smart material sections, rather than being a single uniform smart material layer. Two or more of the smart material sections may comprise different smart materials. The computing device 500 may actuate any number and configuration of the smart material sections to generate a haptic effect. For example, the computing device 500 may transmit electrical signals to one or more electrodes of the electrode layer 506 and/or lower electrode layer 510 to cause one or more smart material sections of the smart material layer 508 to deform in shape. A user may perceive the deformation as a haptic effect. Selectively actuating one or more components of the electrode layer 506, the lower electrode layer 510, and/or the smart material layer 508 may allow the haptic output device 502 to produce a greater range of haptic effects and/or haptic effects that are localized to particular areas of a surface.

Figure 6:
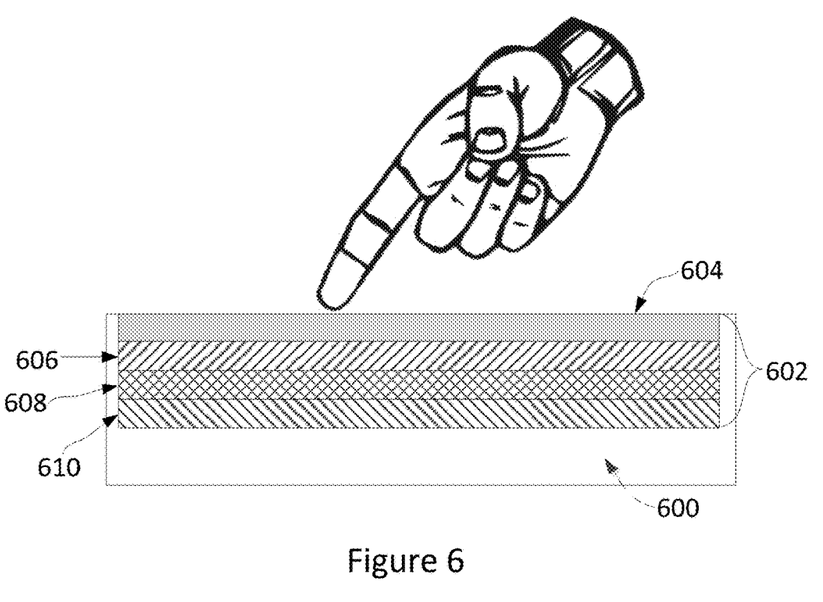
FIG. 6 shows another embodiment of a system for multifunction haptic output devices.

FIG. 6 shows another embodiment of a system for multifunction haptic output devices. The system comprises a haptic output device 602. The haptic output device 602 comprises a first insulator layer 604, a first electrode layer 606, a second insulator layer 608, and a second electrode layer 610.

In some embodiments, the haptic output device 602 can generate dynamic ESF effects and static ESF effects (e.g., as described above with respect to FIG. 2). For example, the computing device 600 may transmit a first signal to the first electrode layer 606. The first signal may be configured to cause the first electrode layer 606 to generate a capacitive coupling between the user's body (e.g., the user's finger) and the first electrode layer 606. The user may perceive the capacitive coupling as a dynamic ESF effect. As another example, the computing device 600 may transmit a second signal to the second electrode layer 610. The second signal may be configured to cause the second electrode layer 610 to generate a capacitive coupling between the user's body (e.g., the user's finger) and the second electrode layer 610. The user may perceive the capacitive coupling as a static ESF effect. In some embodiments, the computing device 600 may leave the first electrode layer 606 floating (e.g., not grounded), e.g., while generating the static ESF effect. This may prevent the first electrode layer 606 from interfering with a static ESF effect perceived by the user.

In some embodiments, dynamic ESF effects can be produced using lower voltages than static ESF effects. For example, the computing device 600 may transmit a first signal to the first electrode layer 606 comprising a magnitude of 100 volts to generate a dynamic ESF effect. The computing device 600 may transmit a second signal to the second electrode layer 610 comprising magnitude of 1,500 volts to generate a static ESF effect.

In some embodiments, the first insulator layer 604 may be different than the second insulator layer 608. For example, the first insulator layer 604 may comprise a different thickness and/or material than the second insulator layer 608. In some embodiments, because of the lower voltages used to generate dynamic ESF effects than static ESF effects, the first insulator layer 604 may be thinner than the second insulator layer 608. In some embodiments, the first insulator layer 604 can protect the user (e.g., against electrical shock) from a voltage applied to the first electrode layer 606, e.g., to generate a dynamic ESF effect. The first insulator layer 604, first electrode layer 606, and/or the second insulator layer 608 can protect the user from a voltage applied to the second electrode layer 610, e.g., to generate a static ESF effect.

In some embodiments, the computing device 600 may switch between haptic-effect types based on a status (e.g., battery level, orientation, location, a program or game status, a hardware component's status, etc.) of the computing device 600. For example, the computing device 600 may be configured to output a first type of haptic effect (e.g., a static ESF haptic effect) in response to detecting that a battery level of the computing device 600 is above a threshold. The computing device 600 may be configured to output a second type of haptic effect (e.g., a dynamic ESF haptic effect) in response to detecting that a battery level of the computing device 600 is below the threshold. In some embodiments, switching between haptic effect types based on the status of the computing device 600 may, e.g., enable the computing device 600 to conserve battery power. For example, the computing device 600 may be able to conserve battery power by switching from a static ESF haptic effect (e.g., which can use more power to generate) to a dynamic ESF effect (e.g., which can use less power to generate) in response to detecting that the battery level is below the threshold.

Advantages of Multifunction Haptic Output Devices

There are numerous advantages of multifunction haptic output devices. For example, such systems may be smaller, cheaper, and easier to install than conventional haptic output devices. In some embodiments, multifunction haptic output devices may take up less space and cost less money than installing a plurality of haptic output devices for generating a plurality of different types of haptic effects.

As another example, in some embodiments, multifunction haptic output devices can be installed on a surface of a computing device (e.g., overlaying a touch-screen display), within the computing device (e.g., below the touch-screen display), and/or elsewhere to provide various types of haptic effects. This may make installation of multifunction haptic output devices easier than for other types of haptic output devices.

In some embodiments, multifunction haptic output devices may be positioned in or on devices previously unable to provide haptic feedback, e.g., due to space restrictions. For example, embodiments may be positioned on the surfaces of pens, socks, rings, watches, glasses, sleeves, gear shifters, or virtually any other wearable or graspable device to provide haptic feedback. Providing haptic feedback in such embodiments may provide a multitude of benefits, for example by allowing users to interact with devices without having to visually focus on the devices. This may increase overall user satisfaction.

In some embodiments, multifunction haptic output devices can provide a user with an enhanced and/or optimized haptic experience. For example, in some embodiments, the computing device may detect a condition in which one type of haptic effect may be perceived as suboptimal by a user. For instance, the computing device may detect a user applying an amount of force above a threshold to a surface of the computing device in which an electrostatic haptic effect may be perceived as weak or of low quality by the user. In such an embodiment, the computing device may responsively use the multifunction haptic output device to generate a different type of haptic effect (e.g., a vibration and/or a deformation haptic effect), e.g., which may be perceived by the user as stronger or of higher quality. Thus, multifunction haptic output devices may allow the computing device to switch between types of haptic effects to provide an enhanced haptic experience.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
a processor;
a memory that includes instructions executable by the processor to cause the processor to:
determine a haptic effect based on an event and
transmit one or more signals associated with the haptic effect; and
a multifunction haptic output device comprising a first electrode layer, a second electrode layer, and a smart layer coupled between the first electrode layer and the second electrode layer, wherein the multifunction haptic output device is configured to:
receive a first signal and a second signal at the first electrode layer, the first signal and the second signal being associated with the one or more signals;
in response to receiving the first signal at the first electrode layer, output a first haptic effect comprising an electrostatic haptic effect or an electro-tactile haptic effect; and
in response to receiving the second signal at the first electrode layer, output a second haptic effect comprising a vibrotactile haptic effect or a deformation haptic effect, wherein the second signal includes a voltage applied across the first electrode layer and the second electrode layer.

2. The system of claim 1, wherein the multifunction haptic output device is configured to selectively produce (i) a first class of haptic effects independently from a second class of haptic effects, or (ii) the second class of haptic effects independently from the first class of haptic effects.

3. The system of claim 2, wherein:
the first class of haptic effects only has (i) electrostatic haptic effects, (ii) vibrotactile haptic effects, (iii) temperature-based haptic effects, (iv) electro-tactile haptic effects, or (v) deformation haptic effects; and
the second class of haptic effects only has (i), (ii), (iii), (iv), or (v).

4. The system of claim 1, wherein:
the multifunction haptic output device comprises a transducer configured to generate an output signal in response to an interaction with the multifunction haptic output device and transmit the output signal to the processor; and
the memory further includes instructions executable by the processor to cause the processor to:
receive the output signal from the multifunction haptic output device;
determine the interaction based on the output signal; and
determine the event based on the interaction.

5. The system of claim 1, wherein the event is a game event.

6. The system of claim 1, wherein the processor, memory, and multifunction haptic output device are included in a mobile device.

7. A method comprising:
determining, by a processor, a haptic effect based on an event
transmitting, by the processor, one or more signals associated with the haptic effect;
generating, by a multifunction haptic output device, the haptic effect based at least in part on the one or more signals, wherein the multifunction haptic output device comprises a first electrode layer, a second electrode layer, and a smart layer coupled between the first electrode layer and the second electrode layer, and wherein the multifunction haptic output device is configured to:
  in response to receiving a first signal at the first electrode layer, output a first haptic effect comprising an electrostatic haptic effect or an electro-tactile haptic effect; and
  in response to receiving a second signal at the first electrode layer, output a second haptic effect comprising a vibrotactile haptic effect or a deformation haptic effect, wherein the second signal includes a voltage applied across the first electrode layer and the second electrode layer.

8. The method of claim 7, wherein the multifunction haptic output device is configured to selectively produce (i) a first class of haptic effects independently from a second class of haptic effects or (ii) the second class of haptic effects independently from the first class of haptic effects.

9. The method of claim 8, wherein:
  the first class of haptic effects only has (i) electrostatic haptic effects, (ii) vibrotactile haptic effects, (iii) temperature-based haptic effects, (iv) electro-tactile haptic effects, or (v) deformation haptic effects; and
  the second class of haptic effects only has (i), (ii), (iii), (iv), or (v).

10. The method of claim 7, further comprising:
  generating, by a transducer of the multifunction haptic output device, an output signal in response to an interaction with the multifunction haptic output device;
  receiving, by the processor, the output signal from the multifunction haptic output device;
  determining, by the processor, the interaction based on the output signal; and
  determining, by the processor, the event based on the interaction.

11. The method of claim 7, wherein the event is a game event.

12. The method of claim 7, wherein the processor and the multifunction haptic output device are included in a mobile device.

13. A multifunction haptic output device comprising:
  an insulation layer;
  a first electrode layer coupled to the insulation layer;
  a second electrode layer; and
  a smart material layer coupled between the first electrode layer and the second electrode layer;
  wherein the multifunction haptic output device is configured to:
    in response to receiving a first signal at the first electrode layer, output a first haptic effect comprising an electrostatic haptic effect or an electro-tactile haptic effect;
    and in response to receiving a second signal at the first electrode layer, output a second haptic effect comprising a vibrotactile haptic effect or a deformation haptic effect, wherein the second signal includes a voltage applied across the first electrode layer and the second electrode layer.

14. The multifunction haptic output device of claim 13, wherein the multifunction haptic output device is configured to selectively produce (i) a first class of haptic effects independently from a second class of haptic effects or (ii) second class of haptic effects independently from the first class of haptic effects.

15. The multifunction haptic output device of claim 14, wherein:
  the first class of haptic effects only has (i) electrostatic haptic effects, (ii) vibrotactile haptic effects, (iii) temperature-based haptic effects, (iv) electro-tactile haptic effects, or (v) deformation haptic effects; and
  the second class of haptic effects only has (i), (ii), (iii), (iv), or (v).

16. The multifunction haptic output device of claim 13, wherein the multifunction haptic output device comprises a transducer configured to generate an output signal in response to an interaction with the multifunction haptic output device and transmit the output signal to a processor.

17. The multifunction haptic output device of claim 13, wherein the multifunction haptic output device is included in a mobile device.

18. The multifunction haptic output device of claim 13, wherein the first electrode layer comprises a plurality of electrodes that are selectively actuatable to produce localized haptic effects.

* * * * *